(12) United States Patent
Yamaguchi (10) Patent No.: US 9,662,795 B2
(45) Date of Patent: May 30, 2017

(54) COVER ATTACHMENT STRUCTURE FOR ROBOT AND ROBOT HAVING THE SAME

(71) Applicant: DENSO WAVE INCORPORATED, Chita-gun, Aichi-pref. (JP)

(72) Inventor: Hiroshi Yamaguchi, Handa (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 248 days.

(21) Appl. No.: 14/478,769

(22) Filed: Sep. 5, 2014

(65) Prior Publication Data

US 2015/0122070 A1 May 7, 2015

(30) Foreign Application Priority Data

Nov. 5, 2013 (JP) ................................. 2013-229785

(51) Int. Cl.
*B25J 19/00* (2006.01)
*B25J 9/00* (2006.01)

(52) U.S. Cl.
CPC ......... *B25J 19/0075* (2013.01); *B25J 9/0009* (2013.01); *Y10T 74/20305* (2015.01)

(58) Field of Classification Search
CPC .. B25J 19/0075; B25J 19/0083; B25J 19/063; B25J 19/06; B25J 9/0009
See application file for complete search history.

(56) References Cited

U.S. PATENT DOCUMENTS

| | | | |
|---|---|---|---|
| 4,904,514 A * | 2/1990 | Morrison | B25J 19/0083 414/728 |
| 5,038,488 A * | 8/1991 | Abramowsky | F16P 3/14 33/501 |
| 6,299,228 B1 * | 10/2001 | Shin | B25J 15/0206 294/106 |
| 6,463,614 B1 * | 10/2002 | Supra | E04H 4/1663 15/1.7 |
| 6,650,393 B1 * | 11/2003 | Nishiguchi | G02F 1/1339 349/156 |
| 6,754,919 B2 * | 6/2004 | Leaphart, Jr. | A47G 9/062 5/417 |
| 8,882,567 B2 * | 11/2014 | Liu | B24B 27/0038 451/270 |
| 9,073,218 B2 * | 7/2015 | Watanabe | B25J 19/0075 |
| 2002/0144565 A1 * | 10/2002 | Ambrose | B25J 19/0025 74/490.03 |
| 2005/0249549 A1 | 11/2005 | Miyahara et al. | |
| 2013/0255428 A1 * | 10/2013 | Hahakura | B25J 18/00 74/490.03 |

FOREIGN PATENT DOCUMENTS

DE 102005021550 A1 12/2005
JP A-2011-031365 2/2011

* cited by examiner

*Primary Examiner* — Terence Boes
(74) *Attorney, Agent, or Firm* — Oliff PLC

(57) ABSTRACT

A cover attachment structure for attaching a cover to a predetermined component of a robot includes a first component, a second component and a third component. The first component is disposed to the predetermined component of the robot. The second component is disposed to an inner part of the cover. The first component and the second component are engaged with each other through the third component. The first component and the second component are drawn to each other by the third component in a manner that the predetermined component and the cover are brought close to each other.

14 Claims, 11 Drawing Sheets

COVER ATTACHMENT STRUCTURE FOR ROBOT AND ROBOT HAVING THE SAME

CROSS REFERENCE TO RELATED APPLICATION

This application is based on Japanese Patent Application No. 2013-229785 filed on Nov. 5, 2013, the disclosure of which is incorporated herein by reference in its entirety.

TECHNICAL FIELD

The present disclosure relates to a cover attachment structure for a robot and a robot having the cover attachment structure.

BACKGROUND

JP 2011-31365A describes that a cover is attached to a surface portion of a robot with a bolt. In case where a robot is used for manufacturing food or medicine, germicidal treatment is performed by washing the surface of the cover with medical fluid or water and then drying, or by exposing the surface of the cover to medicine gas.

In JP 2011-31365A, since the bolt is exposed from the surface of the cover, projection and recess is formed around the bolt. Medical fluid or water may easily remain at the projection and recess, or bacterial growth may be promoted at the projection and recess.

SUMMARY

It is an object of the present disclosure to provide a cover attachment structure in which projection and recess is not generated by making a fastening member not to be exposed from a surface of a cover, and a robot having the cover attachment structure.

According to an aspect of the present disclosure, a cover attachment structure for attaching a cover to a predetermined component of a robot includes a first component, a second component and a third component. The first component is disposed to the predetermined component of the robot. The second component is disposed to an inner part of the cover. The first component and the second component are engaged with each other through the third component, on an inner side of the cover. The first component and the second component are drawn to each other by the third component in a manner that the predetermined component and the cover are brought close to each other.

Accordingly, the first component is provided to the predetermined component of the robot, and the second component is provided to the inner part of the cover. The first component and the second component are made to engage with each other on the inner side of the cover by the third component. For this reason, the cover can be attached to the predetermined component of the robot in the state where the first component, the second component, and the third component are covered by the cover. Therefore, a fastening member such as bolt can be prevented from being exposed from the surface of the cover, so projection and recess is not formed on the surface of the cover.

Furthermore, the first component and the second component are drawn to each other by the third component in a direction where the predetermined component and the cover are brought close to each other. For this reason, the strength of attaching the cover to the predetermined component can be raised without using a fastening member such as bolt.

Furthermore, a clearance is restricted from being generated between the predetermined component and the cover, such that projection and recess is not easily formed on the surface of the robot.

Further, each of the first component and the second component has a cylindrical shape, and diameters of the cylindrical shapes are different from each other between the first component and the second component. One of the first component and the second component is an inner side component, and the other is an outer side component. The inside diameter of the outer side component is larger than the outside diameter of the inner side component, so the inner side component can be inserted into the outer side component. The third component is held on the inner circumference of the outer side component, and is engaged to the outer circumference of the inner side component. The third component is an elastic component which generates an elastic force which draws the first component and the second component to each other.

Further, the outer circumference of the inner side component has an inclination part in which a diameter becomes smaller as going away from the outer side component. The elastic component has a ring shape that is engaged with the outer circumference of the inclination part, and generates the elastic force to shrink toward the center.

The inclination part having the diameter that becomes smaller as extending away from the outer side component is provided to the outer circumference of the inner side component. The elastic component is formed annularly and generates the elastic force to shrink toward the center by engaging with the outer circumference of the inclination part. For this reason, when the elastic component presses the inclination part defined around the inner side component from the radially outer side, a force that brings the inner side component and the outer side component close to each other acts. As a result, a force that brings the predetermined component and the cover close to each other can be made to act with a simple structure.

Further, a cover attachment structure for attaching a cover to a predetermined component of a robot includes a first component, a second component and a third component. The first component is disposed to the predetermined component of the robot. The second component is disposed to an inner part of the cover. The first component and the second component are engaged with each other through the third component on an inner side of the cover. The first component has a cylindrical shape having a first diameter, and the second component has a cylindrical shape having a second diameter that is different from the first diameter. One of the first component and the second component is an inner side component, and the other of the first component and the second component is an outer side component. The inside diameter of the outer side component is larger than the outside diameter of the inner side component, such that the inner side component is able to be inserted inside the outer side component. An outer circumference of the inner side component has an inclination part in which a diameter of the inclination part becomes smaller as extending away from the outer side component. The third component is an elastic component having a ring shape, and is held on an inner side of the outer side component. The elastic component is engaged with an outer circumference of the inclination part so as to generate the elastic force to shrink toward a center of the ring shape.

Accordingly, the above-described advantages can be obtained similarly.

Each of the first component and the second component has a cylindrical shape having a bottom part. A first through hole is defined in the bottom part of the first component, and the first component is attached to the predetermined component by a first fastening component passing through the first through hole. A second through hole is defined in the bottom part of the second component, and the second component is attached to the cover by a second fastening component passing through the second through hole.

Accordingly, each of the first component and the second component is formed in the cylindrical shape with the bottom part, and the first through hole and the second through hole are respectively formed in the bottom part of the first component and the bottom part of the second component. The first component is attached to the predetermined component by the first fastening component passing through the first through hole, and the second component is attached to the cover by the second fastening component passing through the second through hole. For this reason, each of the first component and the second component can be easily attached using a hole through which a bolt passes in a conventional structure. Therefore, the cover attachment structure according to the present application can be realized with minor design change from a conventional predetermined component and a conventional cover.

Furthermore, the first fastening component can be arranged using the inside space of the first component having the cylindrical shape, and the second fastening component can be arranged using the inside space of the second component having the cylindrical shape. Therefore, the first component and the second component can be downsized.

In the cover attachment structure for a robot, the cover is attached to a predetermined component of the robot in the state where the first component, the second component, and the third component are covered by the cover. In this state, the attachment structure is not exposed to the outside of the cover, so means for removing the cover is needed, compared with a conventional structure in which a cover is attached using a bolt.

According to the present disclosure, at this point, the cover has a screw hole passing through the cover from outside to inside, and the predetermined component has a screw receiving part which receives a screw at a position opposing the screw hole.

Since the screw hole passing from outside to inside is formed in the cover, the screw can be projected to the inside of the cover by inserting and screwing the screw in the screw hole. The predetermined component has the screw receiving part which receives the screw at the position opposing the screw hole. For this reason, by screwing the screw and forcing the tip of the screw onto the screw receiving part, a force which separates the predetermined component and the cover apart from each other can act, and the cover can be removed from the predetermined component.

The screw hole is formed in the cover at a position near the second component.

Accordingly, the screw hole is formed near the second component in the cover. For this reason, the force which separates the predetermined component and the cover apart from each other can effectively act. Therefore, the cover can be easily removed from the predetermined component of the robot.

A liquid seal component is applied between the predetermined component and the cover.

Accordingly, the liquid seal component is applied between the predetermined component and the cover. The force bringing the predetermined component and the cover close to each other is acting in the state where the cover is attached to the predetermined component. For this reason, even if the thickness of the liquid seal component is uneven, the thickness of the liquid seal component can be made uniform by the force bringing the predetermined component and the cover close to each other. The seal component can be made in tight and close contact with the predetermined component and the cover due to such force, so the sealing property can be raised.

The second component is one of a plurality of second components arranged along the outer edge part of the cover. The first component is plurally provided to the predetermined component at the positions corresponding to the respective second components. The third component is plurally provided to one of the first component and the second component.

Accordingly, the second component is plurally provided to the outer edge part of the cover, and the first component is plurally provided to the predetermined component at the corresponding position corresponding to the second component. The third component is plurally provided to either the first component or the second component. Thus, the first component and the second component can be drawn to each other in the direction which brings the predetermined component and the cover close to each other. For this reason, the contact closeness can be raised between the predetermined component and the outer edge part of the cover, so medical fluid or bacteria can be restricted from entering inside from the outer edge part of the cover.

A robot may include such a cover attachment structure.

Accordingly, the robot can enjoy the above-described advantages.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

An embodiment is described referring to drawings. In the embodiment, a robot used for, for example, manufacturing medicine at a medicine manufacture factory is described.

Figure 1:
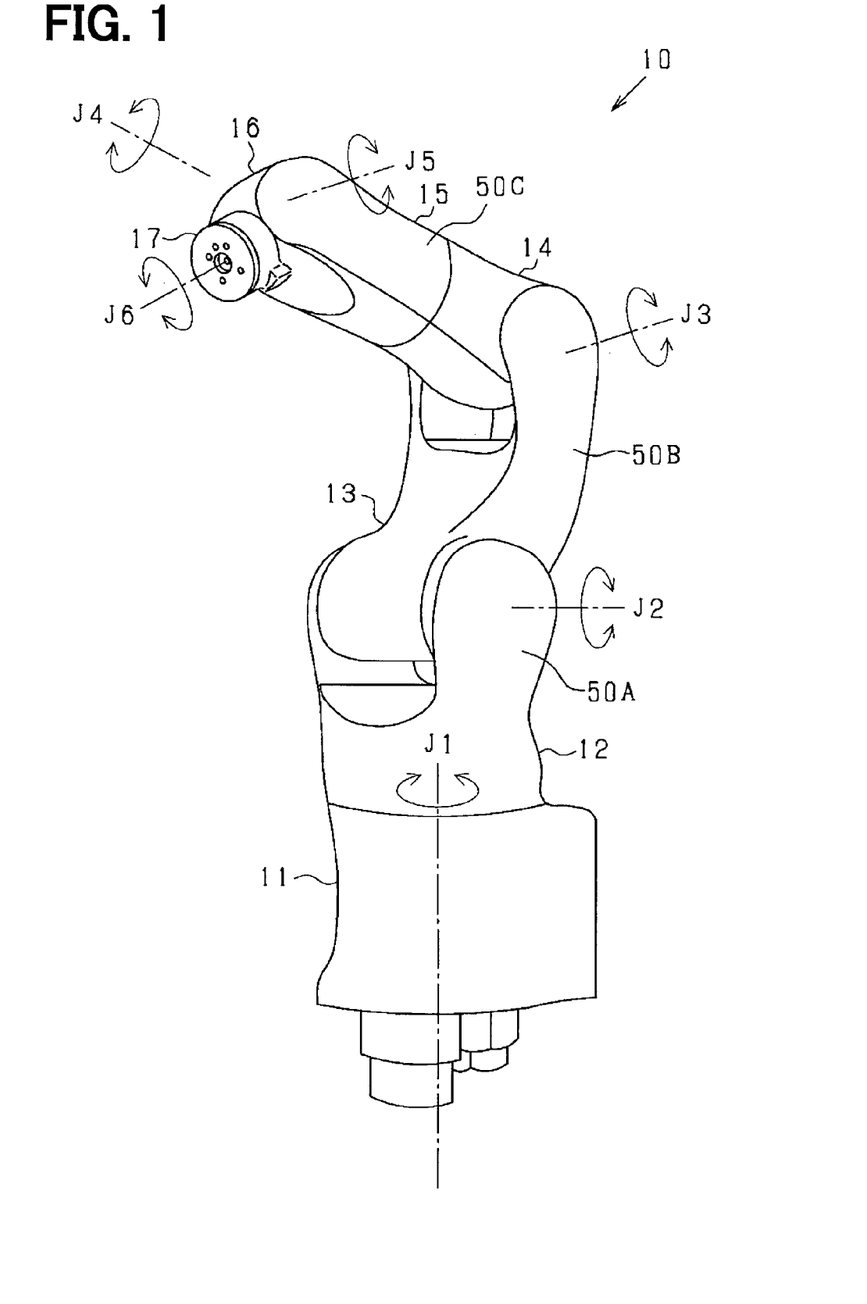
FIG. 1 is a perspective diagram illustrating a robot according to an embodiment.

As shown in FIG. 1, a robot 10 has a base 11, a shoulder part 12, a lower arm 13, a first top arm 14, a second top arm 15, a wrist part 16, and a flange part 17. The base 11 is fixed to, for example, a floor in a factory. The shoulder part 12 is rotatably supported by the base 11, and is rotatable around an axis J1. The lower arm 13 is rotatably supported by the shoulder part 12, and is rotatable around an axis J2. The first top arm 14 is rotatably supported by the lower arm 13, and is rotatable around an axis J3. The second top arm 15 is rotatably supported by the first top arm 14, and is rotatable around an axis J4. The wrist part 16 is rotatably supported by the second top arm 15, and is rotatable around an axis J5. The flange part 17 is rotatably supported by the wrist part 16, and is rotatable around an axis J6.

The robot 10 has plural cases (not all of them shown) which respectively accommodate the above parts. A cover 50C is attached to a case 20 (refer to FIG. 2) for the second top arm 15. A cover 50A is attached to a case (not shown) for the shoulder part 12, and a cover 50B is attached to a case (not shown) for the lower arm 13. The case 20 corresponds to a predetermined component of the robot 10.

Figure 2:
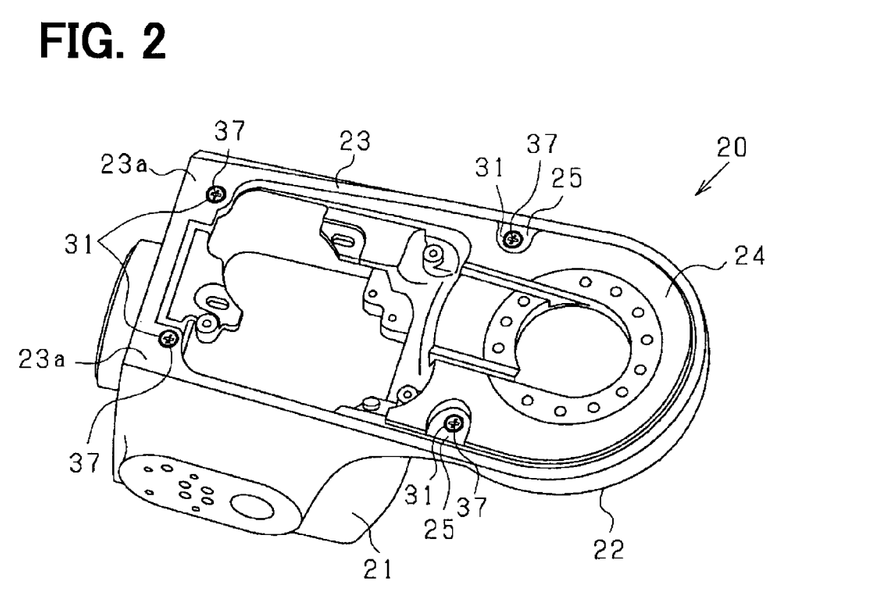
FIG. 2 is a perspective diagram illustrating a case of the robot.

As shown in FIG. 2, the case 20 includes a main part 21 having a square cylindrical shape and a protrusion part 22 having a semicircle board shape. The protrusion part 22 is projected from an end surface 23 of the main part 21. The end surface 23 extends to the protrusion part 22, and has a flat shape along the outer edge of the case 20. The protrusion part 22 has a body part 24 on the inner side of the end surface 23.

The end surface 23 of the main part 21 has two corner portions, and a flat part 23a continuing the end surface 23 is formed on each of the two corner portions. A screw hole is formed in the flat part 23a, and an inner side component 31 (first component) is attached to the flat part 23a with a first screw 37 (first fastening component).

The outer edge part of the body part 24 located near the boundary between the main part 21 and the protrusion part 22 has a flat part 25 parallel to the end surface 23, on the both sides. Each of the flat parts 25 has the screw hole, and the inner side component 31 is attached to the flat part 25 with the first screw 37. That is, a plurality of the inner side components 31 are provided to the outer edge of the case 20.

In addition, the flat part 23a, 25 is formed in a conventional case using a body part defining a bolt hole.

Figure 3:
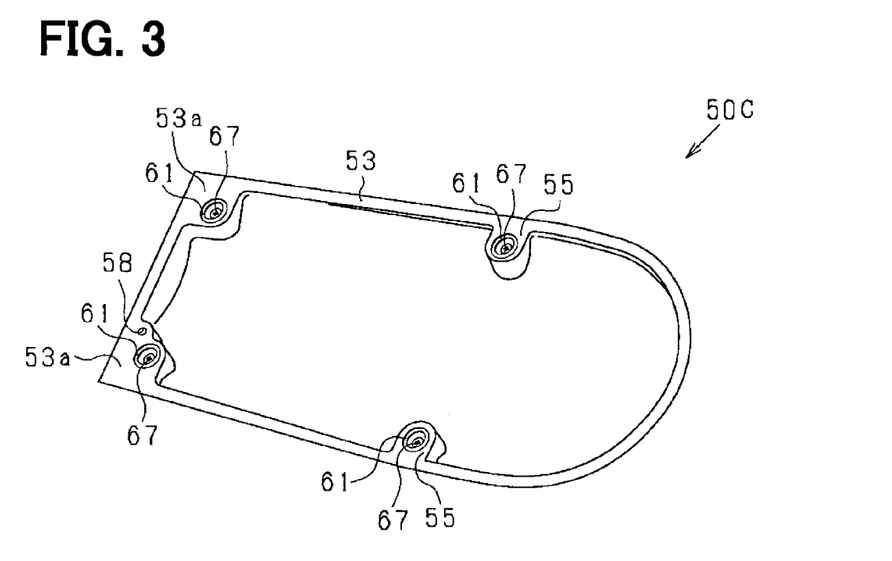
FIG. 3 is a perspective diagram illustrating a back side of a cover for the robot.
Figure 4:
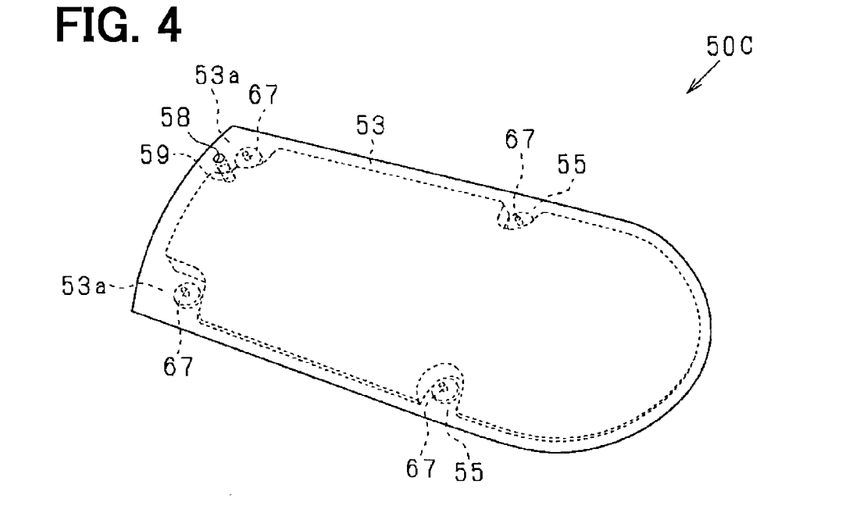
FIG. 4 is perspective diagram illustrating a front side of the cover for the robot.

FIG. 3 is a perspective diagram illustrating a back side of the cover 50C, and FIG. 4 is a perspective diagram illustrating a front side of the cover 50C.

As shown in FIGS. 3 and 4, the cover 50C is shaped to correspond to the shape of the case 20, and is able to cover the opening of the case 20. The cover 50C includes a first portion corresponding to the main part 21 of the case 20, and a second portion corresponding to the protrusion part 22 of the case 20. The cover 50C has a half cylindrical shape, as a whole, having bottom parts at the both ends. The cover 50C is made of aluminum alloy, and the side surface exposed to outside is smoothed by processing.

The cover 50C has an end surface 53 along the outer edge, and the end surface 53 has a flat shape. The end surface 53 of the cover 50C has two corner portions, and a flat part 53a continuing the end surface 53 is formed on each of the two corner portions. The two flat parts 53a respectively correspond to the two flat parts 23a of the case 20. A screw hole is formed in the flat part 53a, and an outer side component 61 (second component) is attached to the flat part 53a with a second screw 67 (second fastening component).

The cover 50C has a flat part 55 parallel to the end surface 53 at positions corresponding to the flat part 25 of the case 20. A screw hole is formed in the flat part 55, and the outer side component 61 is attached to the flat part 55 with the second screw 67. That is, a plurality of the outer side components 61 are provided to the outer edge, on the inner part of the cover 50C. In addition, the flat part 53a, 55 is formed in a conventional case using a body part defining a hole for passing through a bolt.

As shown in FIG. 4, one of the two flat parts 53a at the corner portion of the cover 50C has a screw hole 58 passing through the cover 50C from outside to inside. That is, the screw hole 58 is formed in the cover 50C at a position near the outer side component 61. The screw hole 58 extends at right angles relative to the end surface 53, and the inner circumference is threaded. A setscrew 59 is thrust inside the screw hole 58. The setscrew 59 is a setscrew with a hexagon socket, and does not have a head part. The length of the setscrew 59 is shorter than the depth of the screw hole 58. The tip end part of the setscrew 59 is projected inside the cover 50C when the setscrew 59 is inserted into the screw hole 58. The flat part 23a of the case 20 opposing the screw hole 58 corresponds to a screw receiving part which receives the setscrew 59 projected from the end surface 53 of the cover 50C.

Figure 5:
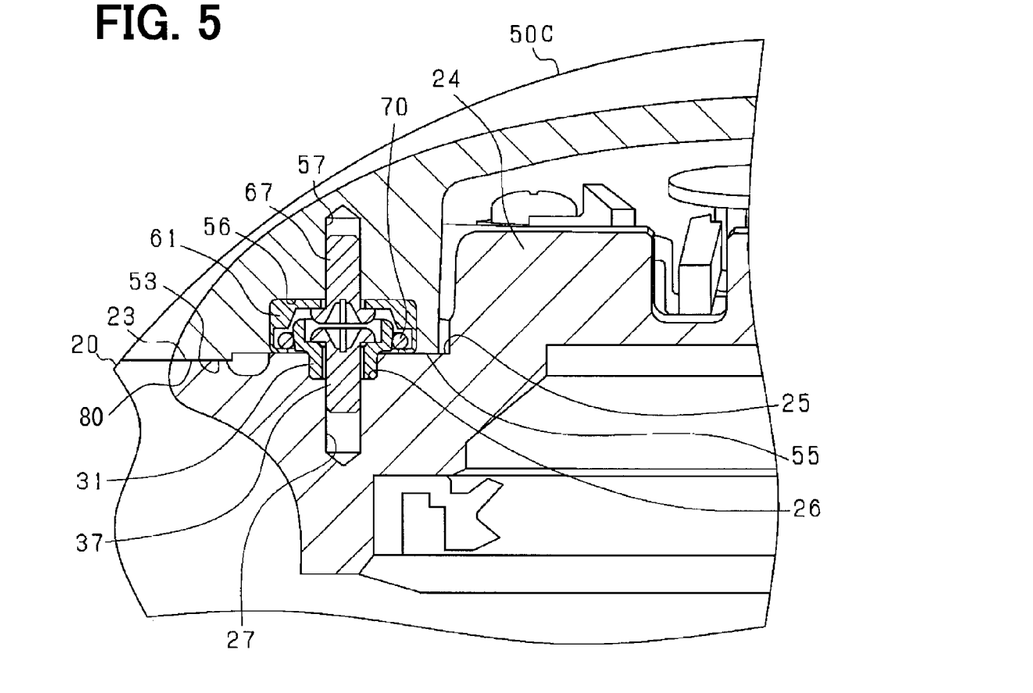
FIG. 5 is a partial sectional view illustrating a cover attachment structure according to an embodiment.
Figure 6:
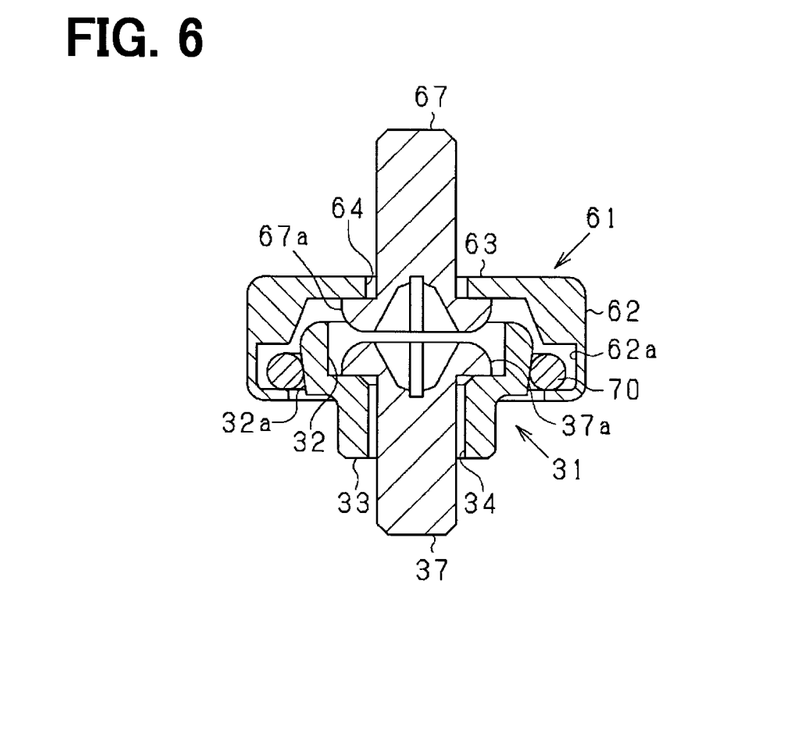
FIG. 6 is an enlarged sectional view illustrating an engagement between an inner side component and an outer side component of the cover attachment structure.
Figure 7:
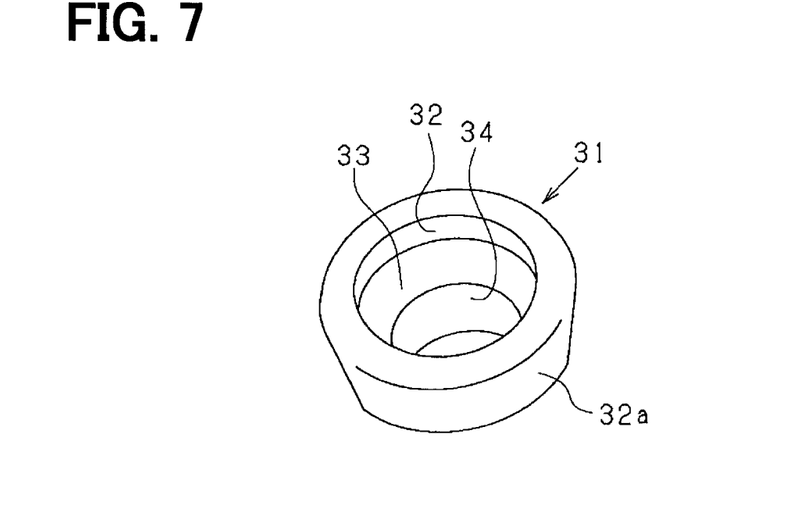
FIG. 7 is an enlarged perspective diagram illustrating the inner side component.
Figure 8:
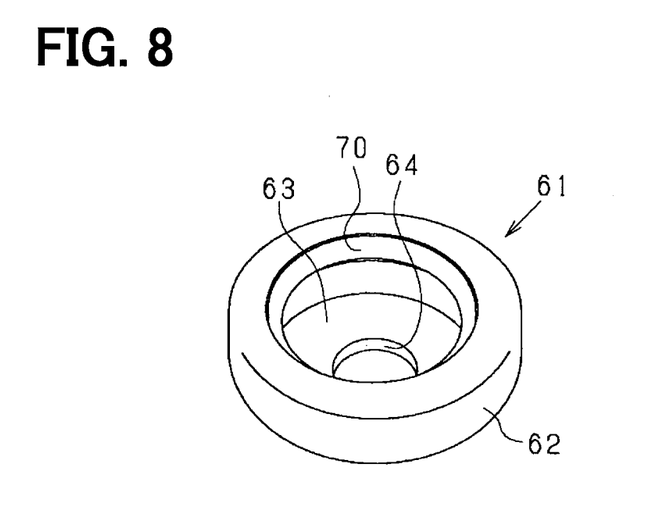
FIG. 8 is an enlarged perspective diagram illustrating the outer side component and a ring spring of the cover attachment structure.

Next, the cover attachment structure for attaching the cover 50C to the case 20 is explained in detail with reference to FIGS. 5-8. FIG. 5 is a sectional view illustrating the cover attachment structure. FIG. 6 is an enlarged sectional view illustrating the inner side component 31 and the outer side component 61 in the engagement state. FIG. 7 is an enlarged perspective diagram illustrating the inner side component 31. FIG. 8 is an enlarged perspective diagram illustrating the outer side component 61 and the ring spring 70.

As shown in FIG. 5, a circular recess portion 26 is defined in the flat part 25 of the case 20. A screw hole 27 is formed at the center of the recess portion 26, and the first screw 37 is inserted into the screw hole 27.

A circular recess portion 56 is formed in the flat part 55 of the cover 50C. A screw hole 57 is formed at the center of the recess portion 56, and the second screw 67 is inserted into the screw hole 57.

In the state where the cover 50C is attached to the case 20, the end surface 23 of the case 20 and the end surface 53 of the cover 50C are in contact with each other. A liquid seal component 80 is applied between the end surface 23 and the end surface 53, as a seal component applied along the outer edge between the case 20 and the cover 50C. While the seal component has adhesive property for causing the case 20 and the cover 50C to be in contact with each other, it is also possible to remove the case 20 and the cover 50C from each other. The seal component produces a force that draws the inner side component 31 and the outer side component 61 to each other in a direction in which the case 20 and the cover 50C are brought close to each other.

As shown in FIGS. 6 and 7, the inner side component 31 has a cylindrical shape including a flange part 32 and a bottom part 33. The diameter of the bottom part 33 is smaller than the diameter of the flange part 32. A first through hole 34 is formed at the center of the bottom part 33. The diameter of the first through hole 34 is set in a manner that it is possible to insert the first screw 37 into the first through hole 34.

The outside diameter of the flange part 32 is gradually increased from the bottom part 33 to an intermediate part, and becomes the maximum at the intermediate part. The outside diameter of the flange part 32 is gradually decreased from the intermediate part to a tip part. For this reason, the outer circumference of the flange part 32 has an inclination part 32a at which the diameter becomes smaller toward the bottom part 33 (that is opposite from the outer side component 61). In other words, the diameter of the inclination part 32a is decreased as going away from the outer side component 61.

As shown in FIG. 5, a part of the bottom part 33 of the inner side component 31 is fitted to the inner circumference of the recess portion 26. Thereby, the positioning of the inner side component 31 is set relative to the case 20. The inner side component 31 is attached to the flat part 25 of the case 20 by inserting the first screw 37 to pass through the first through hole 34 of the inner side component 31 and by inserting the first screw 37 into the screw hole 27. The thickness of the head part 37a of the first screw 37 is thinner than the axial length of the flange part 32 of the inner side component 31. For this reason, the head part 37a of the first screw 37 is accommodated in the flange part 32 of the inner side component 31.

As shown in FIGS. 6 and 8, the outer side component 61 has a cylindrical shape including a flange part 62 and a bottom part 63. The inside diameter of the outer side component 61 is larger than the outside diameter of the inner side component 31, so the inner side component 31 can be inserted inside the outer side component 61. A second through hole 64 is formed at the center of the bottom part 63. The diameter of the second through hole 64 is set in a manner that it is possible to insert the second screw 67 into the second through hole 64.

A circular groove 62a is formed around the inner circumference of the flange part 62. The circular ring spring 70 is loosely fitted to the groove 62a. That is, the ring spring 70 (elastic component, third component) is held on the inner circumference side of the flange part 62. The ring spring 70 has a C-shape and is made of metal having spring property.

FIG. 8 shows a free state of the ring spring 70, and the inner circumference part of the ring spring 70 is exposed and projected to the radially inner side from the inner circumference part of the flange part 62. In the free state, the inside diameter of the ring spring 70 is smaller than the outside diameter of the inclination part 32a of the flange part 32 of the inner side component 31.

In detail, the inside diameter of the ring spring 70 is larger than the outside diameter the flange part 32 at the tip part, and is smaller than the outside diameter of the flange part 32 at the intermediate part and the bottom part 33. When the ring spring 70 is elastically deformed (expanded) to the radially outer side from the free state, the ring spring 70 generates elastic force to shrink to the radially inner side (in a direction toward the center).

As shown in FIG. 5, the outer side component 61 is fitted to the inner circumference of the recess portion 56. Thereby, the positioning of the outer side component 61 is set relative to the cover 50C. The outer side component 61 is attached to the flat part 55 of the cover 50C by inserting the second screw 67 to pass through the second through hole 64 of the outer side component 61 and by inserting the second screw 67 into the screw hole 57.

The thickness of the head part 67a of the second screw 67 is thinner than the axial length of the flange part 62 of the outer side component 61. For this reason, the head part 67a of the second screw 67 is accommodated in the flange part 62 of the outer side component 61. Furthermore, the outside diameter of the head part 67a of the second screw 67 is smaller than the inside diameter of the flange part 32 of the inner side component 31, so it is possible to insert a part of head part 67a of the second screw 67 inside the flange part 32.

The ring spring 70 is fitted and engaged with the outer circumference of the inclination part 32a of the flange part 32 of the inner side component 31. In this state, the ring spring 70 can be expanded from the free state to the radially outer side, such that elastic force is generated to shrink to the radially inner side. Thereby, the inner side component 31 and the outer side component 61 are engaged with each other on the inner side of the cover 50C, and the inner side component 31 and the outer side component 61 are together drawn toward each other in the direction making the case 20 and the cover 50C to approach to each other.

Figure 9:
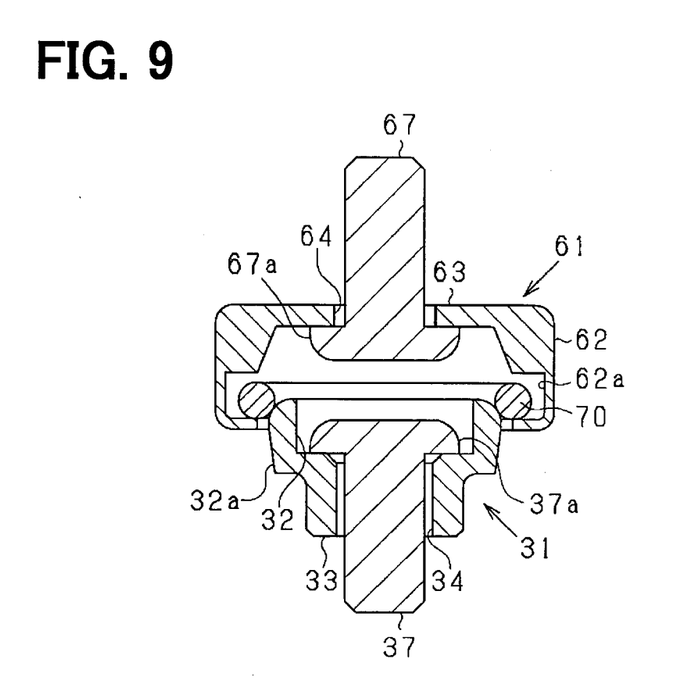
FIG. 9 is an enlarged sectional view illustrating a first procedure for engaging the inner side component and the outer side component with each other.
Figure 10:
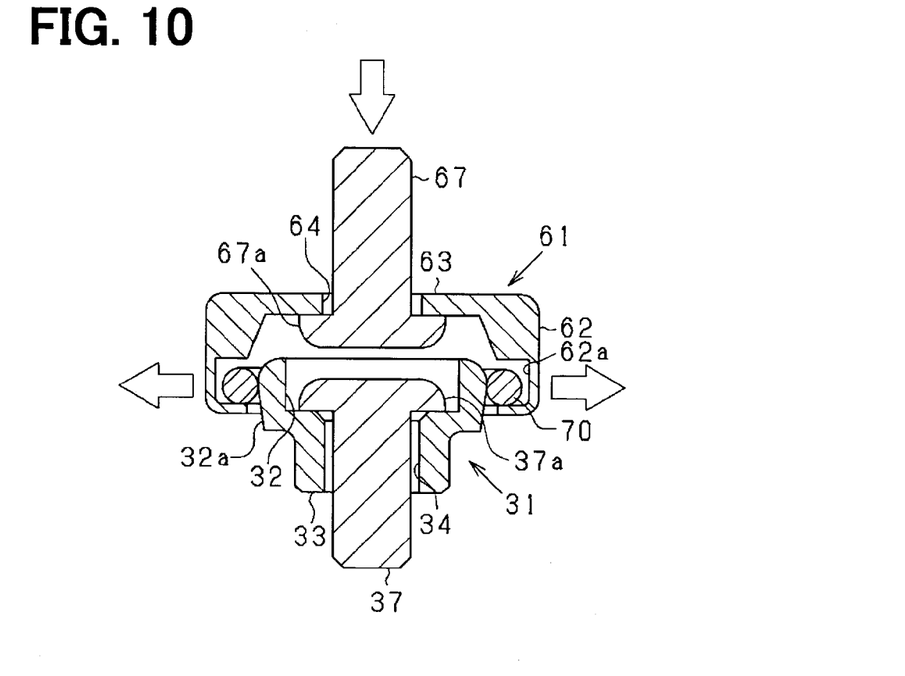
FIG. 10 is an enlarged sectional view illustrating a second procedure for engaging the inner side component and the outer side component with each other.
Figure 11:
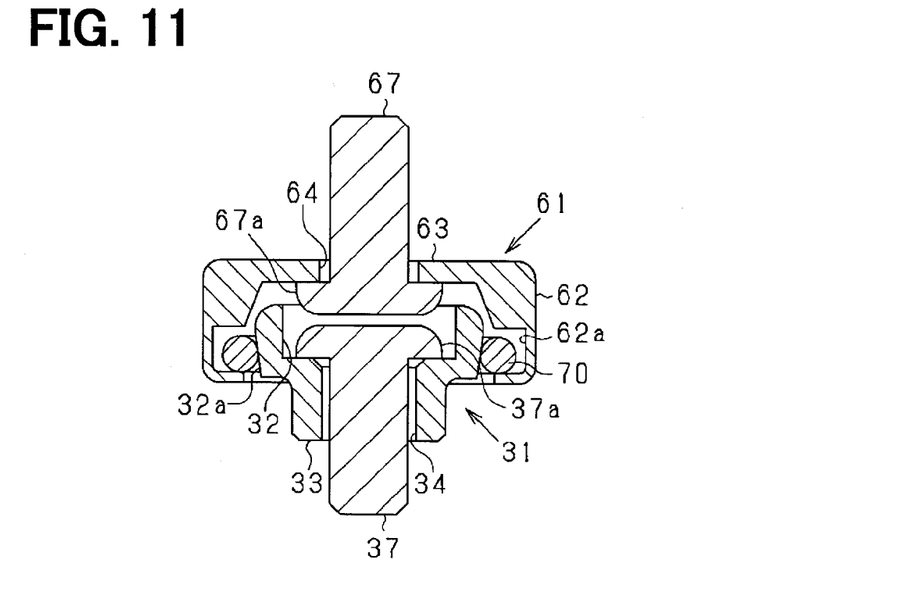
FIG. 11 is an enlarged sectional view illustrating a third procedure for engaging the inner side component and the outer side component with each other.

Next, procedures are described for engaging the inner side component 31 and the outer side component 61 when attaching the cover 50C to the case 20 with reference to FIGS. 9-11.

First, when the cover 50C is brought close to the case 20 while the positioning is conducted, as shown in FIG. 9, a part of the ring spring 70 contacts the tip part of the flange part 32 of the inner side component 31. The ring spring 70 of the cover 50C is made to contact to the corresponding inner side component 31 of the case 20. The inside diameter of the ring spring 70 is larger than the outside diameter the flange part 32 at the tip part, and is smaller than the outside diameter of the flange part 32 at the intermediate part and the bottom part 33. The outside diameter of the flange part 32 becomes larger gradually from the tip side to the intermediate part, and becomes the maximum at the intermediate part, then becomes smaller gradually from the intermediate part to the bottom part 33.

For this reason, when the cover 50C is further pressed to the case 20, as shown in FIG. 10, the ring spring 70 is expanded outward in the radial direction in accordance with the inclination of the outer circumference surface of the flange part 32 from the tip part to the intermediate part. At this time, the ring spring 70 can be expanded outward in the radial direction with small force, in the cover 50C, by pressing the corresponding one of the outer side components 61, among four of the outer side components 61. That is, what is necessary is just to fit the inner side component 31 and the outer side component 61 one by one in turn. In this case, since the ring spring 70 is loosely fitted to the groove 62a of the flange part 62 of the outer side component 61, a predetermined clearance is formed between the inner surface of the groove 62a and the ring spring 70, such that the cover 50C can be permitted to have inclination relative to the case 20.

When the ring spring 70 passes over the intermediate part at which the outside diameter of the flange part 32 becomes the maximum, as shown in FIG. 11, the ring spring 70 is fitted to the outer circumference of the inclination part 32a of the flange part 32. Thereby, the engagement between the inner side component 31 and the outer side component 61 is completed, and the intermediate part of the flange part 32 restricts the ring spring 70 from separating from the inner side component 31. Thereafter, the other inner side components 31 and the corresponding outer side components 61 are engaged with each other one by one similarly, such that the attachment of the cover 50C to the case 20 is completed. In addition, when the force required for engaging the inner side component 31 and the outer side component 61 is small, the engaging between the inner side component 31 and the outer side component 61 can be carried out simultaneously, among the four positions.

Figure 12:
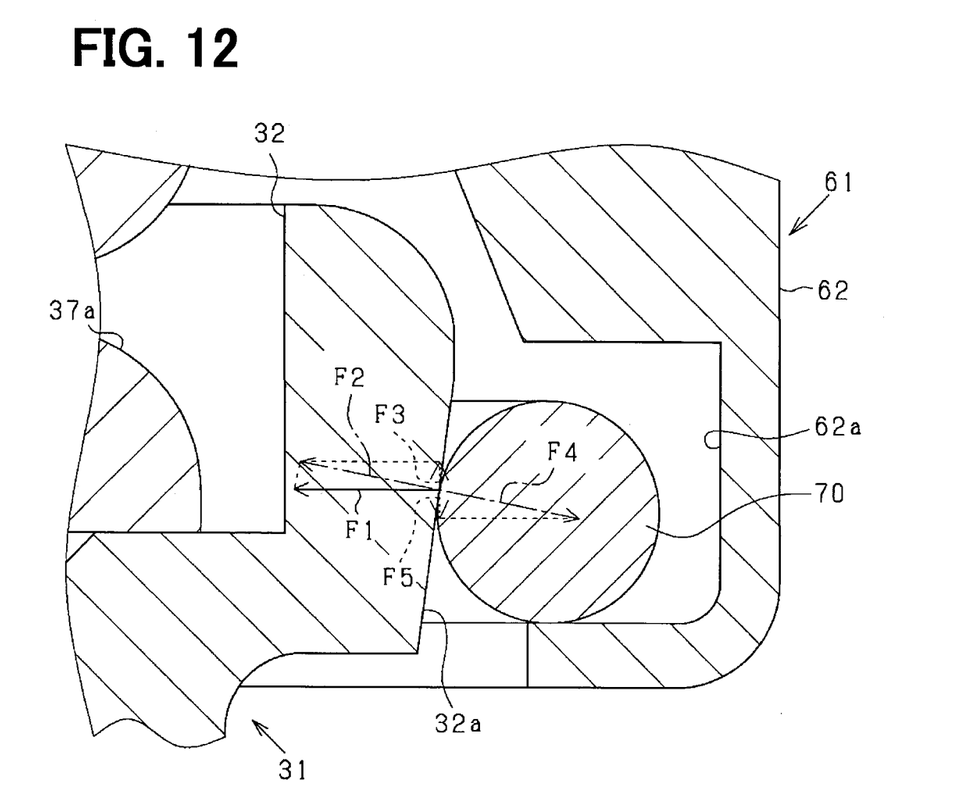
FIG. 12 is an enlarged sectional view illustrating a force applied to the inner side component and the ring spring.

Next, in the state where the cover 50C is attached to the case 20, the force which draws the inner side component 31 and the outer side component 61 to each other in the direction where the case 20 and the cover 50C are brought close to each other is explained. FIG. 12 is an enlarged sectional view illustrating the forces acting on the inner side component 31 and the outer side component 61.

As shown in a solid line arrow direction of FIG. 12, in the state where the ring spring 70 is fitted to the outer circumference of the inclination part 32a of the flange part 32, the ring spring 70 generates an elastic force F1 to shrink inward in the radial direction.

As shown in a single-chain line arrow direction, due to the elastic force F1, a force F2 pressing the outer circumference of the inclination part 32a perpendicularly is acting on all the circumferences of the flange part 32 of the inner side component 31.

As shown in a dashed line arrow direction, the force F2 has an axial component F3 (upward in FIG. 12) in the axial direction of the inner side component 31 and the outer side component 61. For this reason, the flange part 32 of the inner side component 31 is pressed toward the outer side component 61 (toward the cover 50C).

As shown in a single-chain line arrow direction, on the other hand, a reaction force F4 is applied to the ring spring 70 against the force F2.

As shown in a dashed line arrow direction, the reaction force F4 has an axial component F5 (downward in FIG. 12) in the axial direction of the inner side component 31 and the outer side component 61. For this reason, the ring spring 70 is pressed toward the inner side component 31 (toward the case 20). Since the ring spring 70 is held in the groove 62a of the flange part 62 in the outer side component 61, the axial component F5 acts on the flange part 62 (the outer side component 61). As a result, the outer side component 61 is pressed toward the inner side component 31 (toward the case 20).

Thus, the inner side component 31 and the outer side component 61 are drawn to each other, and the force is totally acting in a direction in which the case 20 and the cover 50C are brought close to each other. Accordingly, as shown in FIG. 5, the end surface 23 of the case 20 and the end surface 53 of the cover 50C are in contact with each other so as to press onto each other.

As mentioned above, the liquid seal component is applied between the end surface 23 and the end surface 53. Even if the liquid seal component is unevenly applied, the thickness of the liquid seal component is made uniform by the force acting in the direction in which the case 20 and the cover 50C are brought close to each other. The sealing between the end surface 23 and the end surfaces 53 is achieved by the seal component. The other covers 50A and 50B are respectively attached to the cases of the robot 10 similarly.

Therefore, a fastening member such as bolt can be prevented from being exposed from the surface of the cover 50C, and projection and recess is not formed on the surface of the cover 50C. In case where germicidal treatment is performed by washing the surface of the cover 50C with medical fluid or water and then drying, or by exposing the surface of the cover 50C to medicine gas, medical fluid or water does not easily remain on the surface of the cover 50C, and bacterial growth is not generated, because projection and recess is not formed on the surface of the cover 50C.

With the cover attachment structure mentioned above, the cover 50C is attached to the case 20 of the robot 10 in the state where the inner side component 31, the outer side component 61, and the ring spring 70 are covered by the cover 50C. In this state, since the cover attachment structure is not exposed to the outside of the cover 50C, compared with a structure in which a cover is attached using a bolt, means for removing the cover 50C is needed.

At this point, the cover 50C has the screw hole 58 passing through the cover 50C from outside to inside, and the setscrew 59 is thrust into the screw hole 58. For this reason, the setscrew 59 is projected to the inner side of the cover 50C by inserting the setscrew 59. The case 20 has the flat part 23a at the position opposing the screw hole 58. By inserting the setscrew 59 to press the tip end portion of the setscrew 59 on the flat part 23a, a force is generated to separate the case 20 and the cover 50C apart from each other, such that the engagement of the inner side component 31 and the outer side component 61 is canceled at the position nearest to the setscrew 59. Here, the screw hole 58 is formed in the cover 50C at the position adjacent to the outer side component 61. For this reason, when the setscrew 59 is inserted, the force separating the case 20 and the cover 50C apart from each other can effectively act on the inner side component 31 and the outer side component 61 in the engaged state.

When at least one engagement between the inner side component 31 and the outer side component 61 is canceled, the other engagements between the inner side component 31 and the outer side component 61 can be easily canceled by leaning the cover 50C to the case 20. By the above, the cover 50C can be removed from the case 20.

Advantages of the present embodiment are explained in detail.

The inner side component 31 is disposed to the case 20 of the robot 10, and the outer side component 61 is disposed to the inner part of the cover 50C. The inner side component 31 and the outer side component 61 are engaged with each other on the inner side of the cover 50C with the ring spring 70. For this reason, the cover 50C can be attached to the case 20 of the robot 10 in the state where the inner side component 31, the outer side component 61, and the ring spring 70 are covered by the cover 50C. Therefore, a fastening member such as bolt can be prevented from being exposed from the surface of the cover 50C, and projection and recess is not formed on the surface of the cover 50C.

Due to the ring spring 70, the inner side component 31 and the outer side component 61 can be drawn to each other in the direction where the case 20 and the cover 50C are brought close to each other. For this reason, the strength of attaching the cover 50C to the case 20 can be raised without using a bolt. In addition, a clearance is restricted from being generated between the case 20 and the cover 50C, and projection and recess is not formed on the surface of the robot 10.

The outer circumference part of the inner side component 31 has the inclination part 32a in which the diameter becomes smaller as going away from the outer side component 61. The ring spring 70 is formed annularly and is engaged with the outer circumference of the inclination part 32a so as to generate the elastic force to shrink in the direction toward the center. For this reason, when the ring spring 70 presses the inclination part 32a of the inner side component 31 from the radially outer side, the force of bringing the inner side component 31 and the outer side component 61 close to each other acts. As a result, the force of bringing the case 20 of the robot 10 and the cover 50C close to each other can be made to act with a simple structure.

The inner side component 31 and the outer side component 61 are formed to have the cylindrical shape having the bottom part 33 and the bottom part 63, respectively. The first through hole 34 is formed in the bottom part 33 of the inner side component 31, and the second through hole 64 is formed in the bottom part 63 of the outer side component 61. The inner side component 31 is attached to the case 20 with the first screw 37 passing through the first through hole 34, and the outer side component 61 is attached to the cover 50C with the second screw 67 passing through the second through hole 64. For this reason, each of the inner side component 31 and the outer side component 61 can be easily attached to a conventional case and a conventional cover, respectively, using the portion having a hole through which a bolt passes. Therefore, the cover attachment structure according to the embodiment can be obtained with small change in the design from a conventional case and a conventional cover.

The head part 37a of the first screw 37 and the head part 67a of the second screw 67 can be arranged, respectively, using the space inside the inner side component 31 having the cylindrical shape and the space inside the outer side component 61 having the cylindrical shape. Therefore, the inner side component 31 and the outer side component 61 can be downsized.

Since the screw hole 58 passing through the cover 50C from outside to inside is defined in the cover 50C, the setscrew 59 can be made to project to the inner side of the cover 50C by inserting the setscrew 59 to the screw hole 58. The case 20 has the flat part 23a which receives the setscrew 59 at the portion facing the screw hole 58. For this reason, when the tip of the setscrew 59 is forced to contact onto the flat part 23a by inserting the setscrew 59, the force separating the case 20 and the cover 50C apart from each other can act, such that the cover 50C can be removed from the case 20.

The screw hole 58 is formed in the cover 50C at the position near the outer side component 61. For this reason, when the setscrew 59 is inserted, the force separating the case 20 and the cover 50C apart from each other can be effectively applied on the inner side component 31 and the outer side component 61 in the engaged state. Therefore, the cover 50C can be easily removed from the case 20 of the robot 10.

The liquid seal component 80 is applied between the case 20 and the cover 50C. In the state where the cover 50C is attached on the case 20, the force is acting in the direction that the case 20 and the cover 50C are brought close to each other. For this reason, even if the thickness of the liquid seal component 80 is uneven, the thickness can be equalized by the force acting in the direction of bringing the case 20 and the cover 50C close. Furthermore, the seal component can be made in tight contact with the case 20 and the cover 50C by the force, so the sealing property can be raised.

The outer side component 61 is one of a plurality of outer side components arranged along the outer edge part of the cover 50C, and the inner side component 31 is arranged at the positions corresponding to the outer side components 61. The ring spring 70 is disposed to the outer side component 61, and the inner side component 31 and the outer side component 61 can be drawn to each other in the direction which brings the case 20 and the cover 50C close with each other. For this reason, the adhesion property between the case 20 of the robot 10 and the outer edge part of the cover 50C can be raised, and medical fluid, bacteria, etc. can be prevented from entering inside from the outer edge part of the cover 50C.

Since the setscrew 59 does not have a head part, projection and recess is not formed on the surface of the cover 50C.

The screw hole 58 can be closed by thrusting the setscrew 59 into the screw hole 58, so medical fluid, bacteria, etc. cannot enter inside through the screw hole 58.

The embodiment may be modified as follows.

The liquid seal component 80 may be replaced with a gel seal component, or other seal component having a sheet shape such as packing or O-ring. Moreover, the seal component is omissible if the adhesion property between the end surface 23 of the case 20 and the end surface 53 of the cover 50C is high.

Figure 13:
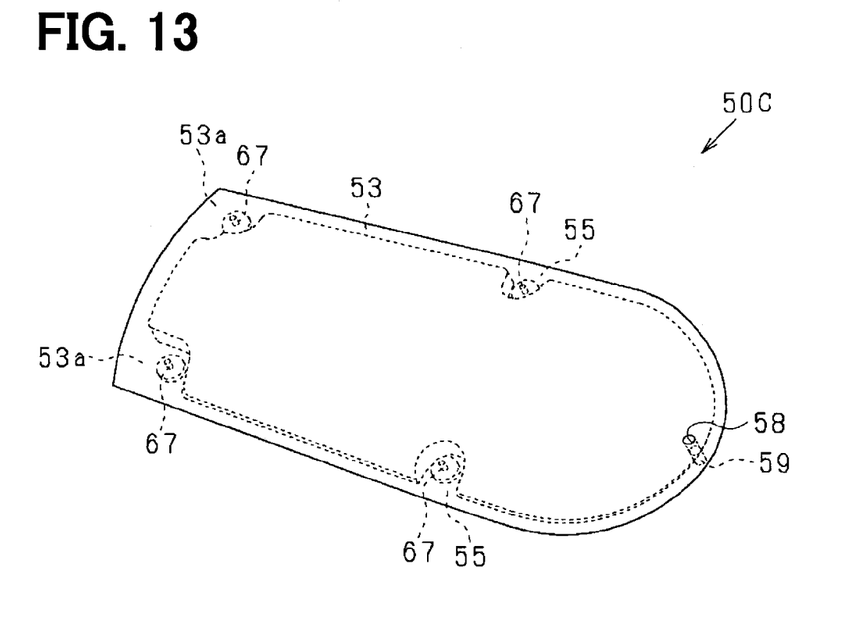
FIG. 13 is a perspective diagram illustrating a modification in the cover.

As shown in FIG. 13, the position of the screw hole 58 and the setscrew 59 may be changed into middle of the two outer side components 61 in the outer edge part of the cover 50C. Moreover, the screw hole 58 and the setscrew 59 may be formed at the other position of the cover 50C different from the outer edge part.

The setscrew 59 may be other screw other than the setscrew with the hexagon socket, such as a screw having a head part. Moreover, a minute through hole may be formed instead of the screw hole 58, and a bar-shaped jig or tool can be inserted into the through hole so as to remove the cover 50C from the case 20.

Figure 14:
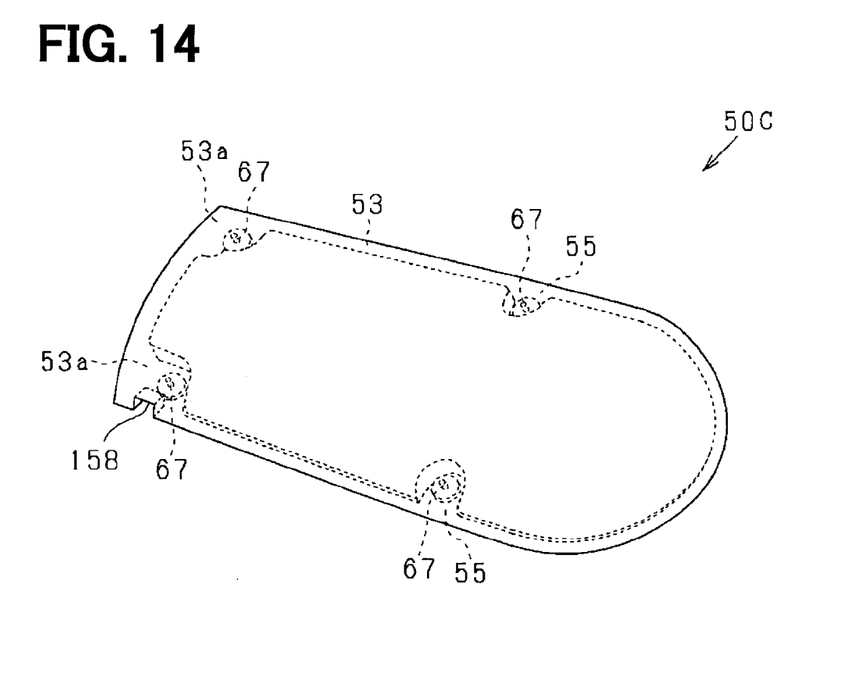
FIG. 14 is a perspective diagram illustrating a modification in the cover.

As shown in FIG. 14, the screw hole 58 may be omitted and a recess portion 158 may be formed at the outer edge part of the cover 50C. The recess portion 158 is opened to outside of the cover 50C. The recess portion 158 is formed at the flat part 53a or the flat part 55. In this case, a jig or tool can be inserted in the recess portion 158, and the cover 50C can be removed from the case 20. The recess portion 158 may be formed at the outer edge part of the case 20 to be opened to outside of the case 20. In this case, the recess portion 158 is formed at the flat part 23a or the flat part 25. In addition, if there is a clearance, into which a jig or tool can be inserted, between the end surface 23 of the case 20 and the end surface 53 of the cover 50C, the recess portion 158 is omissible.

Figure 15:
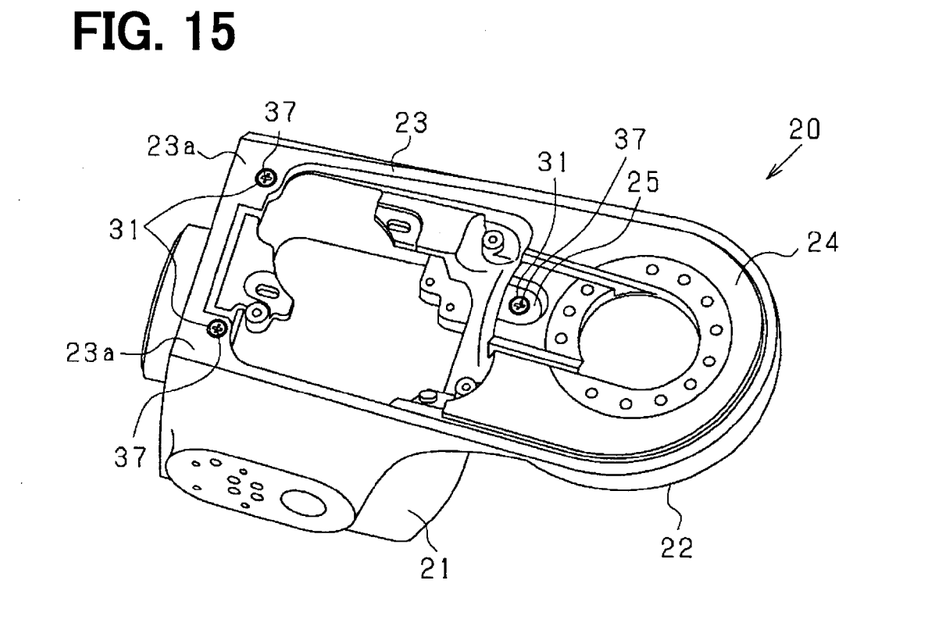
FIG. 15 is a perspective diagram illustrating a modification in the case of the robot.
Figure 16:
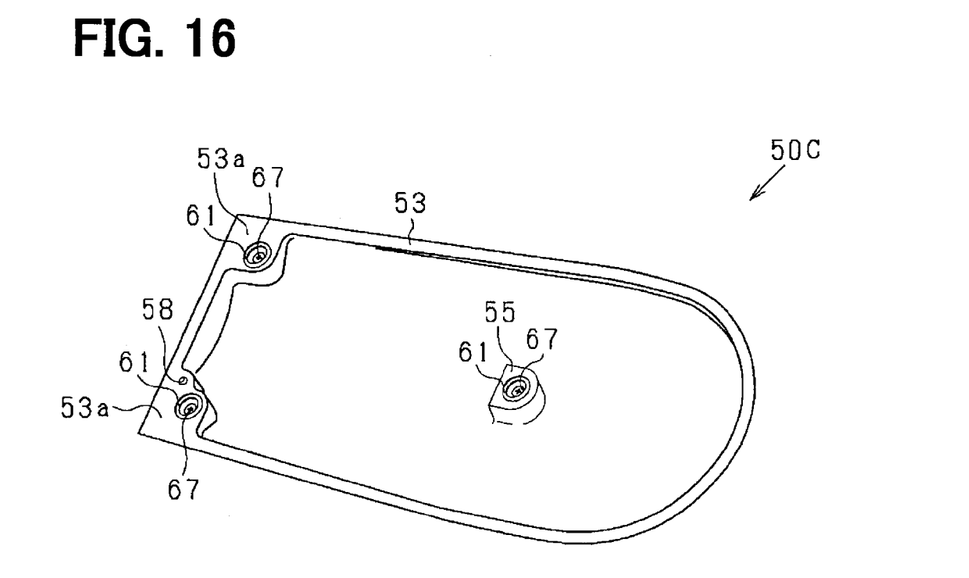
FIG. 16 is a perspective diagram illustrating a modification in the cover.

As shown in FIG. 15, the position of the flat part 25, the inner side component 31, and the first screw 37 may be changed into the central side from the outer edge part of the case 20. In this case, it is necessary to change the position of the flat part 55, the outer side component 61, and the second screw 67 in the cover 50C, as shown in FIG. 16. That is, the flat part 55, the outer side component 61, and the second screw 67 are formed on the central side of the cover 50C.

Figure 17:
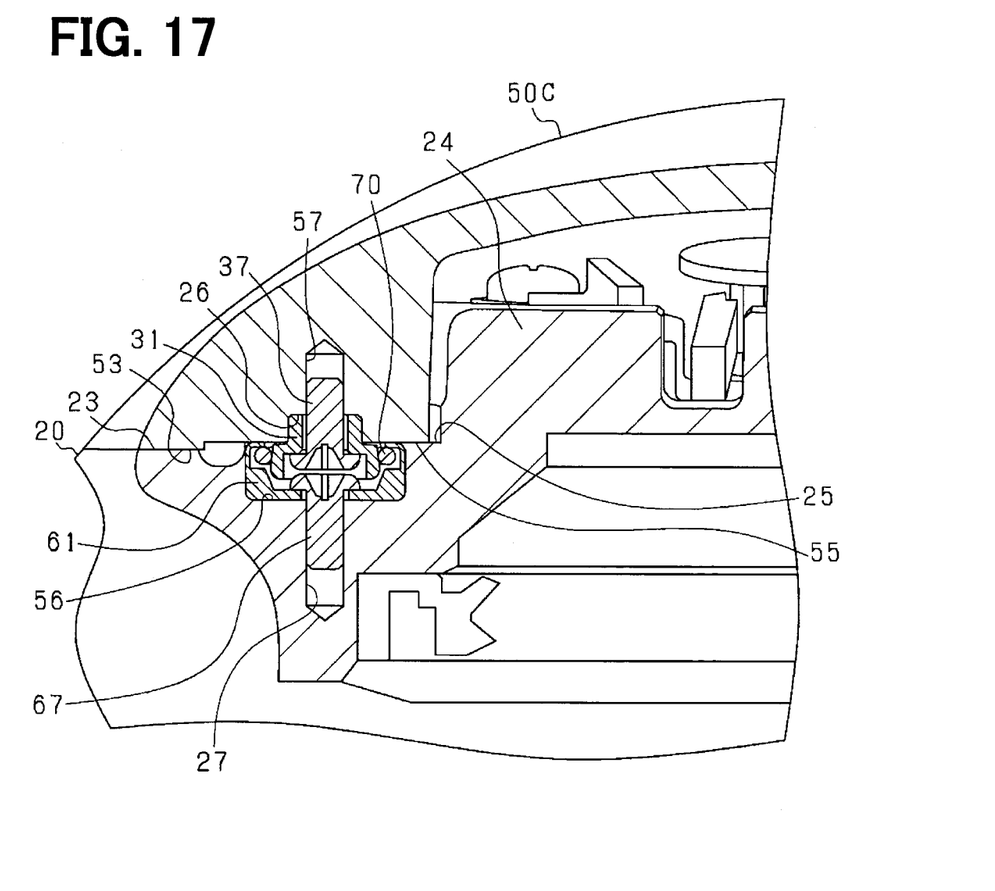
FIG. 17 is a partial sectional view illustrating a modification in the cover attachment structure.

As shown in FIG. 17, the outer side component 61 (first component) and the ring spring 70 (third component) may be attached to the case 20, and the inner side component 31 (second component) may be attached to the cover 50C. The same effect and advantage can be achieved as the above-mentioned embodiment by such structure.

Figure 18:
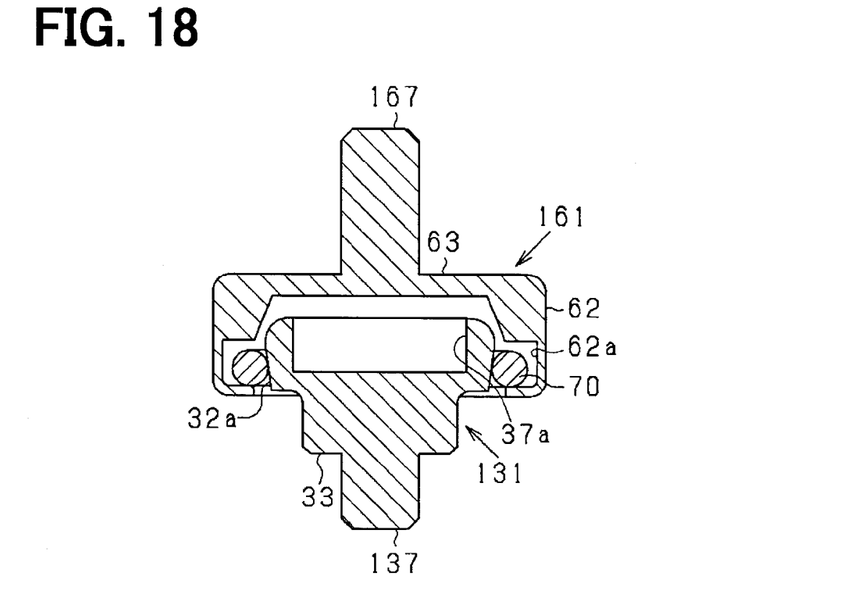
FIG. 18 is an enlarged sectional view illustrating a modification in the inner side component and the outer side component.

As shown in FIG. 18, the inner side component 31 and the first screw 37 shown in FIG. 6 may be integrally formed as one-piece component as an inner side component 131. The outer side component 61 and the second screw 67 shown in FIG. 6 may be integrally formed as one-piece component as an outer side component 161. The inner side component 131 has a first screw part 137 equivalent to the first screw 37, and the outer side component 161 has a second screw part 167 equivalent to the second screw 67. In this case, the inner side component 131 and the ring spring 70 are provided to one of the case 20 and the cover 50C, and the outer side component 161 is provided to the other of the case 20 and the cover 50C. Accordingly, the number of components necessary for producing the cover attachment structure can be reduced.

Figure 19:
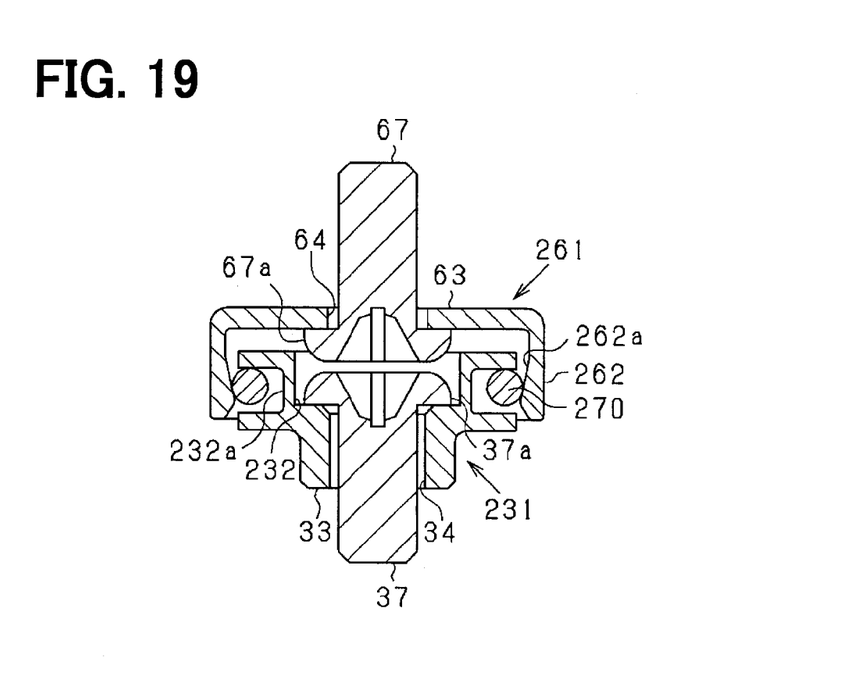
FIG. 19 is an enlarged sectional view illustrating a modification in the inner side component, the outer side component, and the ring spring.

As shown in FIG. 19, a ring spring 270 is held in a groove 232a defined around the outer circumference of the inner side component 231, and the inner circumference part of the flange part 262 of the outer side component 261 may have the inclination part 262a in which a diameter becomes smaller as going away from the inner side component 231. In this case, the inner side component 231 and the ring spring 270 are provided to one of the case 20 and the cover 50C, and the outer side component 261 is provided to the other of the case 20 and the cover 50C. Accordingly, when the ring spring 270 presses the inclination part 262a of the outer side component 261 from the radially inner side, the force of bringing the inner side component 231 and the outer side component 261 close to each other acts. Therefore, the effect and advantage similar to the above-mentioned embodiment can be achieved.

The ring spring 70 is not limited to have the circular shape, and may have a polygon shape.

The end surface 23 of the case 20 and the end surface 53 of the cover 50C may contact with each other through a curved surface contact without limited to the flat surface contact.

Such changes and modifications are to be understood as being within the scope of the present disclosure as defined by the appended claims.

What is claimed is:

1. A cover attachment structure for a robot configured to attach a cover to a predetermined component of the robot, the cover attachment structure comprising:
   a first component located in a first recess portion of the predetermined component and fastened to the predetermined component through a first fastener;
   a second component located in a second recess portion of an inner part of the cover and fastened to the cover through a second fastener; and
   a third component on an inner side of the cover through which the first component and the second component are kept engaged with each other, wherein
   the third component causes the first component and the second component to be drawn to each other in a manner that the predetermined component and the cover are brought close to each other.

2. The cover attachment structure according to claim 1, wherein
   the first component has a cylindrical shape having a first diameter,
   the second component has a cylindrical shape having a second diameter that is different from the first diameter,
   one of the first component and the second component is an inner side component, and the other of the first component and the second component is an outer side component,
   an inside diameter of the outer side component is larger than an outside diameter of the inner side component, such that the inner side component is able to be inserted inside the outer side component,
   the third component is held on an inner side of the outer side component and is engaged with an outer circumference of the inner side component, and
   the third component is an elastic component that generates an elastic force to draw the first component and the second component to each other.

3. The cover attachment structure according to claim 2, wherein
   the outer circumference of the inner side component has an inclination part in which a diameter of the inclination part becomes smaller as extending away from the outer side component, and
   the elastic component has a ring shape, and is engaged with an outer circumference of the inclination part so as to generate the elastic force to shrink toward a center of the ring shape.

4. A cover attachment structure for a robot to attach a cover to a predetermined component of the robot, the cover attachment structure comprising:
   a first component disposed to the predetermined component of the robot;
   a second component disposed to an inner part of the cover; and
   a third component through which the first component and the second component are engaged with each other on an inner side of the cover, wherein
   the first component has a cylindrical shape having a first diameter,
   the second component has a cylindrical shape having a second diameter that is different from the first diameter,
   one of the first component and the second component is an inner side component, and the other of the first component and the second component is an outer side component,
   an inside diameter of the outer side component is larger than an outside diameter of the inner side component, such that the inner side component is able to be inserted inside the outer side component,
   an outer circumference of the inner side component has an inclination part in which a diameter of the inclination part becomes smaller as extending away from the outer side component,
   the third component is an elastic component having a ring shape, and is held on an inner side of the outer side component, and
   the elastic component is engaged with an outer circumference of the inclination part so as to generate the elastic force to shrink toward a center of the ring shape.

5. The cover attachment structure according to claim 1, wherein
   each of the first component and the second component has a cylindrical shape having a bottom part, the bottom part of the first component has a first through hole passing through the bottom part of the first component, and the first component is attached to the predetermined component by a first fastening component passing through the first through hole, and the bottom part of the second component has a second through hole passing through the bottom part of the second component, and the second component is attached to the cover by a second fastening component passing through the second through hole.

6. The cover attachment structure according to claim 1, wherein the cover has a screw hole passing through the cover from outside to inside, and the predetermined component has a screw receiving part that receives a screw at a position opposing the screw hole.

7. The cover attachment structure according to claim 6, wherein the screw hole is defined in the cover at a position near the second component.

8. The cover attachment structure according to claim 1 further comprising:

a liquid seal component applied between the predetermined component and the cover.

9. The cover attachment structure according to claim 1, wherein the second component is one of a plurality of second components arranged around an outer edge part of the cover, the first component is one of a plurality of first components that are respectively provided to the plurality of second components at positions corresponding to the second components on the predetermined component, and the third component is one of a plurality of third components that are respectively provided to either the first component or the second component.

10. A robot comprising the cover attachment structure according to claim 1.

11. The cover attachment structure according to claim 1, wherein the third component is an elastic component that generates an elastic force to draw the first component and the second component to each other.

12. The cover attachment structure according to claim 11, wherein the third component is a spring.

13. A cover attachment structure for a robot configured to attach a cover to a predetermined component of the robot, the cover attachment structure comprising:

a first component disposed to the predetermined component of the robot;

a second component disposed to an inner part of the cover; and a third component through which the first component and the second component are engaged with each other on an inner side of the cover, wherein the third component causes the first component and the second component to be drawn to each other in a manner that the predetermined component and the cover are brought close to each other, the first component has a cylindrical shape having a first diameter, the second component has a cylindrical shape having a second diameter that is different from the first diameter, one of the first component and the second component is an inner side component, and the other of the first component and the second component is an outer side component, an inside diameter of the outer side component is larger than an outside diameter of the inner side component, such that the inner side component is able to be inserted inside the outer side component, the third component is held on an inner side of the outer side component and is engaged with an outer circumference of the inner side component, and the third component is an elastic component that generates an elastic force to draw the first component and the second component to each other.

14. The cover attachment structure according to claim 13, wherein the outer circumference of the inner side component has an inclination part in which a diameter of the inclination part becomes smaller as extending away from the outer side component, and the elastic component has a ring shape, and is engaged with an outer circumference of the inclination part so as to generate the elastic force to shrink toward a center of the ring shape.

* * * * *